(12) United States Patent
Caplan

(10) Patent No.: US 6,183,149 B1
(45) Date of Patent: *Feb. 6, 2001

(54) IMPACT ABSORBING KEYBOARD, CONTOURED TO THE NATURAL SHAPE OF THE HAND

(75) Inventor: Leslie S. Caplan, San Francisco, CA (US)

(73) Assignee: Prosper Street Technologies, L.L.C., San Francisco, CA (US)

(*) Notice: Under 35 U.S.C. 154(b), the term of this patent shall be extended for 0 days.

This patent is subject to a terminal disclaimer.

(21) Appl. No.: 09/229,649

(22) Filed: Jan. 13, 1999

Related U.S. Application Data (63) Continuation-in-part of application No. 08/957,964, filed on Oct. 21, 1997, now Pat. No. 5,899,616.

(51) Int. Cl.⁷ ........................................ B41J 5/00

(52) U.S. Cl. ..................... 400/489; 400/491; 400/488

(58) Field of Search ........................ 400/488, 489, 400/490, 491, 491.3, 495.1, 714, 715; 150/154, 165; 200/302.2, 512; 206/320

(56) References Cited

U.S. PATENT DOCUMENTS

| | | | |
|---|---|---|---|
| 726,107 | 4/1903 | Stanton | 400/490 |
| 832,617 | 10/1906 | Munson et al. | 400/491 |
| 1,203,570 | 11/1916 | Beaubien | 400/491 |
| 2,102,526 | 12/1937 | Guilfoyle | 197/100 |
| 2,181,955 | 12/1939 | Ward, Jr. | 197/103 |
| 2,733,804 | 2/1956 | Wesson | 197/103 |
| 3,848,723 | 11/1974 | Hogue | 400/490 |
| 3,929,216 | 12/1975 | Einbinder | 400/489 |
| 4,042,090 | 8/1977 | Hasebe et al. | 197/102 |
| 4,501,936 | 2/1985 | Morse | 200/302.2 |
| 4,734,679 | 3/1988 | Haskins | 340/365 |
| 4,755,072 | 7/1988 | Hoornweg | 400/490 |
| 4,974,183 | 11/1990 | Miller | 400/489 |
| 5,021,638 | 6/1991 | Nopper et al. | 235/145 R |
| 5,080,155 | 1/1992 | Crozier | 200/302.2 |
| 5,145,270 | 9/1992 | Darden | 400/488 |
| 5,183,346 | 2/1993 | Tesar | 400/490 |

(List continued on next page.)

OTHER PUBLICATIONS

"Ergonomic Keyboard Eases Typing Strain", Jeff Angus, InfoWorld, Mar. 1, 1993.
"Kinesis' Ergonomic Keyboard Relieves the Strain on Sore Wrists", Abigail Crane, Kinesis Corporation Promotional Brochure, 1995, 1996.
Just Rubber Industry Co., LTD Brochure (from the internet).

*Primary Examiner*—Stephen R. Funk
*Assistant Examiner*—Leslie J. Grohusky
(74) *Attorney, Agent, or Firm*—Skjerven Morrill MacPherson LLP (57) ABSTRACT

An attachment to or a keyboard itself or other devices which require extending the fingers and hands so as to reach keys of the device. The invention includes at least one key pillow. The key pillow either replaces or fits over at least one key of a keyboard or other such device to advantageously alter the consistency, texture, shape, or height of the traditional key to which the key pillow corresponds. The key pillow is shaped so as to extend into the comfort zone of a user to thereby minimize the stretching and twisting required of the user's fingers, hands, wrists, and arms. The key pillow may be applied to a keyboard of a portable computer, where the at least one key pillow is inflatable. The at least one key pillow may also be applied to devices such as a computer mouse. The key pillow must extend into a comfort zone of the user. Also, a palm rest is designed so as to maintain the user's hands at a certain height above the lip of the keyboard, which may or may not include key pillows. The palm rests have a height which reduces the introduction of tension into the user's arms and upper body and thus, are suitable for reducing the occurrence of carpal tunnel syndrome and other RSIs. The palm rest may be formed in combination with the keyboard or totally separate therefrom.

11 Claims, 5 Drawing Sheets

U.S. PATENT DOCUMENTS

| | | | |
|---|---|---|---|
| 5,244,296 | 9/1993 | Jensen | 400/715 |
| 5,270,507 | 12/1993 | Nakamura et al. | 200/511 |
| 5,290,115 | 3/1994 | Little | 400/491 |
| 5,391,006 | 2/1995 | Danziger | 400/488 |
| 5,464,292 | 11/1995 | Grant | 400/715 |
| 5,490,647 | 2/1996 | Rice | 400/715 |
| 5,491,313 | 2/1996 | Bartley et al. | 200/310 |
| 5,507,458 | 4/1996 | Campbell et al. | 400/715 |
| 5,560,724 | 10/1996 | Iwasa et al. | 400/490 |
| 5,582,375 | 12/1996 | Martin | 248/118.3 |
| 5,610,602 | 3/1997 | Hargreaves | 341/22 |
| 5,673,040 | 9/1997 | Hargreaves et al. | 341/22 |
| 5,689,253 | 11/1997 | Hargreaves et al. | 341/22 |
| 5,735,619 | 4/1998 | Myint | 400/489 |
| 6,005,496 | 12/1999 | Hargreaves et al. | 341/22 |

IMPACT ABSORBING KEYBOARD, CONTOURED TO THE NATURAL SHAPE OF THE HAND

CROSS REFERENCE TO RELATED APPLICATIONS

This application is a continuation-in-part of application Ser. No. 08/957,964 filed Oct. 21, 1997, now allowed, and which issued as U.S. Pat. No. 5,899,616 on May 4, 1999.

BACKGROUND OF THE INVENTION

1. Field of the Invention

The present invention relates to keyboards and other devices which require manipulation via extension of the fingers, and in particular to a keyboard designed to minimize stress and injury related to carpal tunnel syndrome and other repetitive stress and strain injuries.

2. Description of Related Art

Incidents of Repetitive Strain Injuries (RSI), also known as Cumulative Trauma Disorder (CTD), such as Carpal Tunnel Syndrome (CTS) are increasing at an astronomical rate, affecting nearly two million workers annually and costing an estimated $20 billion per year in workers' compensation, medical benefits, and lost wages. RSI to the upper extremities results, in part, from the repetitive reaching, stretching, bending, flexing, and twisting of fingers. Maintaining the wrist in an awkward position during these repetitive motions increases the likelihood of injury. Holding the body and upper extremities in a static position (either sitting or standing) associated with keyboard use and data input also increases the likelihood of injury. Over time, these awkward repetitive motions can inflame soft tissue, creating pressure on various nerves and causing pain, numbness, and tingling sensations in the upper extremities. RSI may result in pain, numbness, weakness, or loss of dexterity or use of the hands and fingers.

Computer keyboard operators such as secretaries, data entry personnel, computer programmers, and journalists are among the most frequent victims of RSI. From the standpoint of typing speed, keyboards have advantageously evolved to the point where pauses in typing required by typewriters for carriage returns, paper feeds, and manual error corrections are no longer required While disadvantageous from an efficiency standpoint, these typing pauses provided breaks in the repetitive motions associated with typing. Consequently, the occurrence of repetitive strain injuries was much lower than it is today.

Despite the increased efficiency of the keyboard, the evolution of the keyboard from a health standpoint has been largely overlooked. With a conventional keyboard, the palms "float" in the air or rest on the desk or a conventional wrist rest located in front of and below the keyboard. With a conventional wrist rest, the wrist is forced to bend upwards to place the fingers on and depress the keys. Consequently, the muscle and tendons in the hands, arms, neck, and shoulders must continually support the fingers at this upward angle. Maintaining this position while typing for an extended period of time can strain the muscles and tendons of the hands, arms, neck, and shoulders and significantly contributes to repetitive strain injuries.

Additionally, many keyboards today have a non-linear relationship between the force applied to a key relative to the downward distance a key travels during a key stroke. That is, many keyboards require a relatively large force to initiate a key stroke, but require a relatively small force on the keyboard key for the remainder of the stroke. The result is that often a greater force than necessary is applied to a key during the latter portion of the key stroke, and the abrupt beginning and end of the stroke results in an impact or shock and vibration on the fingers. While this effect is relatively insignificant in striking a single key, the cumulative effect of these forces, vibrations, and shocks from continuous typing can aggravate nerves and soft tissue in the upper extremities to the point that CTS and other repetitive strain injuries can occur.

Commercially available keyboards that attempt to address some of these issues do so by changing the layout of the keys. These keyboards are intimidating and inhospitable to typists who are used to the traditional layout and have failed to gain popularity.

Moreover, conventional wrist rests are available that support the fingers and hands of the user above the keys of the keyboard. Such conventional wrist rests also may be attached to the keyboard or sloped away therefrom. Known wrist rests may be formed of soft or hard material.

SUMMARY OF THE INVENTION

It is therefore an advantage of the present invention to provide a keyboard or an attachment thereto substantially alleviating many of the causes of CTS and other related repetitive strain injuries.

It is a further advantage of the present invention to provide a keyboard or an attachment thereto including pads for elevating the palms and preventing an awkward, strained angle between the fingers and lower arm.

It is another advantage of the present invention to provide soft key surfaces to alleviate much of the impact and shock and vibration occurring on the fingers during a keyboard stroke in conventional keyboards.

It is still a further advantage of the present invention to provide a keyboard with key pillows that either adhere to or replace the keys of a keyboard. The key pillows are shaped so as to extend into a comfort zone of a user. The comfort zone is defined as the zone into which the fingers of a user extend as they travel comfortably between key pillows or conventional key tops. Travel through this comfort zone is defined as the natural movement of the fingers. Although some extension of the fingers will always be necessary to strike the key pillows, the fact that the key pillows extend into the user's comfort zone keeps such extension to a minimum. This minimum reaching of the fingers is also known as the natural movement of the fingers and hands. The shape of the key pillows is designed to minimize the reaching, stretching, and twisting that may result in strain.

It is another advantage of the present invention to provide a comfortable, anti-skid key surface to reduce the force required to actuate a key. That is, the surface of the key pillows may provide a surface with a larger coefficient of friction than is found on a normal keyboard.

It is a further advantage of the present invention to provide a solid, continuous layer over a keyboard to prevent dirt, dust, fluids and other particulates from entering between the keys of the keyboard.

It is also an advantage of the present invention to redistribute or increase the surface area of the keys in order to allow the typist to vary his or her hand position, but still effectively strike the keys.

These and other advantages are accomplished by the present invention, which in a preferred embodiment relates to an adaptation to a conventional keyboard, including a single keypad or a plurality of pads, or key pillows. The key pillows can replace or fit over the existing keys of a conventional or nonstandard keyboard to advantageously alter the consistency, texture and/or shape of the traditional keys. As noted above, the key pillows are formed of varying heights and shapes so as to extend into the comfort zone of a user. In alternative embodiments, the key pillows may be formed into a tablet to replace or fit over the keyboards.

The invention further includes raised pads at the front of the keyboard on which the palms may rest during typing to reduce the bend or sag in the wrists, and to support the weight of the hand and arm. Such palm rests may be formed integrally with a keyboard or be separate from the keyboard. They may accompany a keyboard employing any key shape including key pillows and conventional keys.

The key pillows elevate and reshape the keys including the space bar of a traditional keyboard into a sculpted form to better accommodate the varying lengths, strengths, and dexterities of the fingers. For example, the outer keys which are depressed by the shorter pinky and ring fingers are raised and shaped so as to extend toward the center of the keyboard, to thereby reduce twisting, and stretching of the fingers typically necessary to strike those keys. Further, the space bar may be elevated to reduce the motion required of the wrist and/or thumb in striking that bar. This puts the keys into the comfort zone of a user. That is, the user has to extend his or her fingers less than with conventional keys to reach the key pillows on the keyboard, thereby reducing stress on hands, fingers, and the upper extremities of a user, thereby reducing the likelihood of repetitive stress injury.

The surfaces of each key pillow are preferably soft and shock absorbent to reduce shock to the fingers upon a keystroke, and are also preferably textured to reduce slippage and the force required to activate a particular key. Where each key pillow is part of a key pillow tablet, the entire tablet may be formed of a soft, shock absorbent, textured surface, or such soft, shock absorbent, textured surfaces may only be provided on the key pillows of the tablet. Alternatively, the key pillow tablet may be formed of a particular material, and a soft, shock absorbent, textured material may be provided on the top surfaces of the key pillows of the tablet.

The present invention significantly reduces the risk of CTS and other repetitive strain injuries, is more comfortable to use than conventional keyboards, and is easy for a typist to learn to use. First, the raised palm rests support a typist's palms and reduce the muscle and tendon strain associated with typing with the wrist bent at an awkward angle. The raised palm rests also relieve strain and tension in a typist's hands by supporting the weight of the arms and shoulders during typing or resting. This additional support reduces the likelihood of nerve irritation and damage and reduces the risk of tendon and soft tissue inflammation within the wrists and throughout the upper extremities. Second, by varying the shape of the key pillows, the typical reaching, twisting, and stretching of the fingers to depress the keys of a conventional keyboard will be reduced, thereby further reducing the strain on the muscles and tendons in the upper extremity. Third, by providing the keys with a shock absorbent and textured upper surface, the shock and vibration to which the fingers are subjected on each keystroke is reduced.

BRIEF DESCRIPTION OF THE DRAWINGS

These advantages and other features, characteristics, methods of use and operation as well as the economies of manufacture will become clear to any person skilled in the art to which the present invention pertains from a study of the following detailed description taken in conjunction with the appended claims and drawings. In the drawings:

DETAILED DESCRIPTION OF THE PRESENTLY PREFERRED EXEMPLARY EMBODIMENTS

Figures 1, 8:
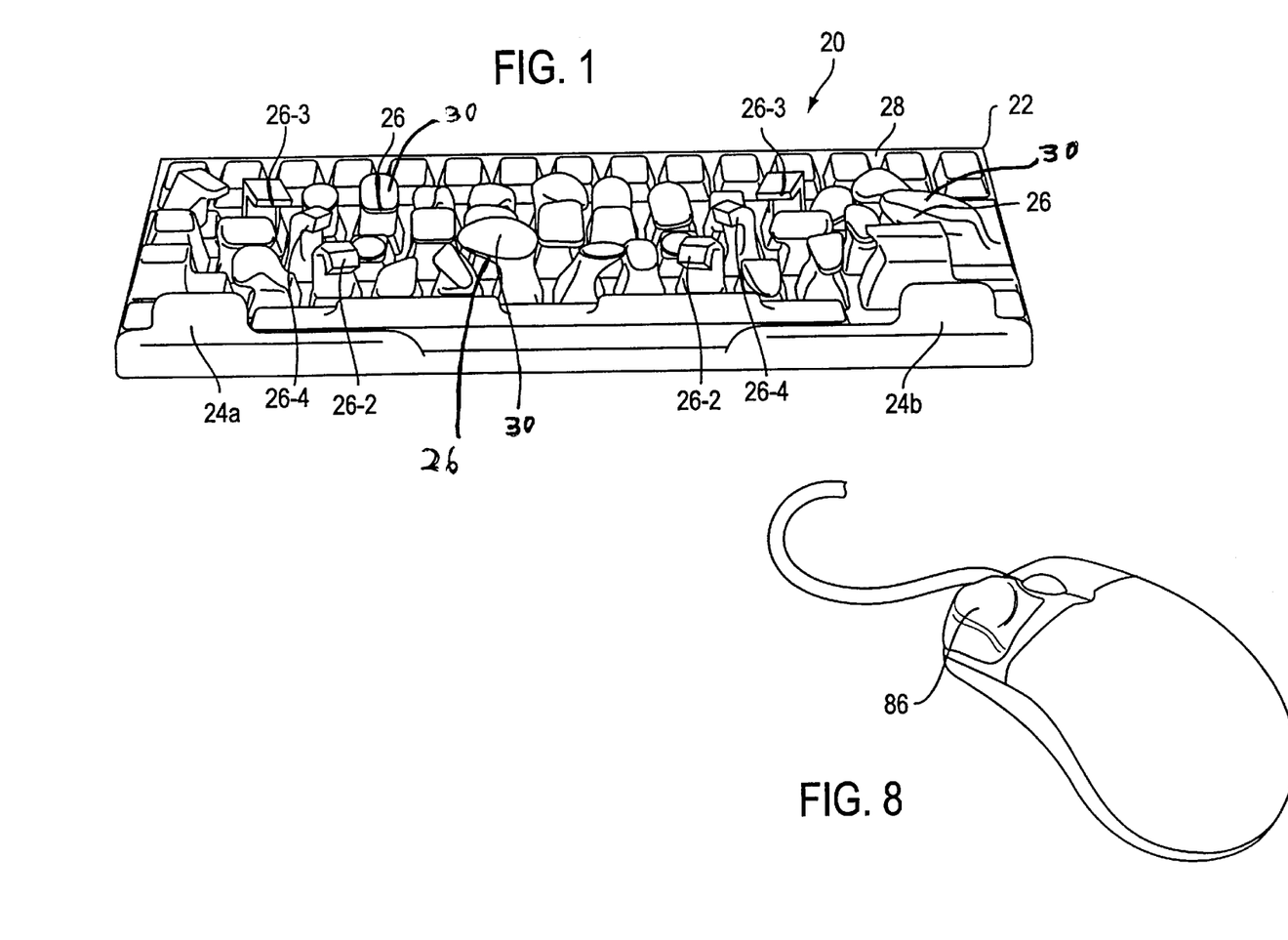
FIG. 1 is a perspective view of the keyboard according to the present invention.
FIG. 8 is a view of a computer mouse having keys thereon that extend into a comfort zone of a user.

The invention will now be described with reference to FIGS. 1–4 and 6–7 which in general depict a keyboard 20 having a length and width approximating that of a conventional full-sized keyboard (e.g., approximately 20 inches by 8 inches). Other dimensions may be used in alternative embodiments such as that shown in FIGS. 5A and 5B, which depict a device intended for use with a portable computer or other device, such as medical or geological equipment, which require portability, and thus may require a smaller or thinner keyboard. The keyboard 20 shown in FIG. 1 may have a standard or non-standard keyboard layout of alphanumeric keys. The preferred embodiment includes a standard QWERTY layout. Common commercial adaptations of the standard layout include the AT keyboard layout, XT keyboard layout and APPLE MACINTOSH® keyboard layout. Non-standard keyboard layouts include for example splitting the standard layout into two halves, angled with respect to each other, such as for example the Natural Keyboard manufactured by MICROSOFT® Corporation. It is understood that the present invention may be adapted to work with any of the various known or future keyboards. Additionally, it is contemplated that the present invention may be used on other devices that use keys, including but not limited to, musical instruments, cash registers, calculators, adding machines, telephones, stenographic machines, and computer mice as shown in FIG. 8. Any device that could be the source of repetitive strain injury or would be made more comfortable by the addition of key pillows is a candidate for use with the present invention.

Referring now to FIGS. 1–4, there is shown a keyboard 20 including an attachment 22 affixed thereon. Attachment 22 may include raised pads 24a and 24b for supporting the palms, and at least one key pillow 26 fitting over or replacing the respective key on the keyboard. A base material 28 may surround and attach each of the key pillows 26 and pads 24a and 24b, so that the attachment 22 forms a continuous cover over the keyboard 20. The attachment may be formed with elastic straps to hold the attachment on the keyboard. Thus, the attachment may be easily removed, cleaned, and replaced. Other known fastening systems may alternatively be used. In a preferred embodiment of the invention, the lower surface of the attachment is formed with negative impressions of the keys of keyboard 20, to enable the attachment to fit over the keyboard keys. The upper surface of the attachment includes the key pillows 26 directly over the keys of the keyboard 20, which key pillow are formed to various heights and inclinations as explained hereinafter.

In a preferred embodiment of the invention, the negative impression for each key on the underside of the attachment is formed such that the attachment extends partially over the keys of the keyboard, i.e., so that the attachment extends partially down along the vertical sides of each key. However, it is understood that the negative impression for each key on the underside of the attachment may be formed to a depth so that the attachment fits substantially entirely over the keys of keyboard 20. Moreover, in a further embodiment of the invention, the bottom surface of attachment 22 may be substantially flat, without any impressions. In this embodiment, the attachment may simply lie on top of each of the keys of keyboard 20. This latter embodiment may additionally have small brackets formed on the underside of the attachment, which brackets entirely or partially surround each key of the keyboard to assist in keeping the key pillows 26 aligned over their respective keys. Alternatively, this latter embodiment may be secured to the respective keys of keyboard 20 by an adhesive.

The attachment has thus far been described as fitting over keys of a conventional keyboard. However, in a further embodiment of the invention as shown in FIG. 1, the invention may replace one or more of the keys of a keyboard. In this embodiment, an attachment with a negative impression or each post on the underside of the attachment may be formed to a depth so that the attachment may be fitted directly over the posts on which the keys are mounted in conventional keyboards. In any of the above-described keyboard and attachment embodiments, the attachment may simply rest over or on top of the keys or posts of the keyboard. Alternatively, an adhesive may be applied to the underside of the attachment so that the attachment is fixedly held in place over or on top of the keys or posts of the keyboard.

As mentioned above, the keys of a conventional keyboard may be replaced by key pillows 26, with the key pillows 26 acting as the keys of the keyboard. Thus, when a key pillow 26 is pushed down, the respective key switch, i.e. the electrical connection, is actuated. The attachment is the keyboard, and thus, the present invention replaces a conventional keyboard.

In a preferred embodiment, each of the key pillows 26 may be formed of a soft, shock absorbent material, such as, for example, silicone, rubber, latex, urethane, foam, molded and filled spandex, or any combination of these materials. It is understood that the key pillows 26 may be formed of other hard or soft materials in alternative embodiments of the invention. As explained in the Background of the Invention section, due in part to the larger force required to initiate a key stroke as compared to the remainder of the stroke, a greater force is applied downward on the keys by the fingers than the upward force of the keys during the latter portion of a keystroke. This results in an impact or shock as well as vibration to the fingers at the top and bottom of each key stroke. The shock absorbent material from which the key pillows 26 may be formed can greatly reduce the shock and vibration received by the fingers.

The upper surfaces of key pillows 26 are preferably textured to reduce the likelihood of a finger slipping on a key, and to reduce the force necessary to depress a key. As would be appreciated by those skilled in the art, the key pillows may be textured in various configurations, including, for example, nubs, ridges, fine bristles, or the character(s) appearing on the key being raised relative to the key surface. In a preferred embodiment, a representative outline of the alphanumeric character or function associated with a particular key may be indicated on the upper surface of the key pillow located thereon. The upper surface of the key pads may additionally or alternatively be covered with or made of slip resistant material.

As previously indicated, the height and shape of key pillows 26 on top of keyboard 20 vary with respect to each other. In one embodiment, the key pillows in the home row and row thereabove (i.e., the rows starting with "a" and "q", respectively) of a conventional QWERTY keyboard served by the pinky and ring finger (i.e., "q", "w", "tab", "caps lock", "shift", "control", "z", and "x" or "p", "o", "[", "]", """, "shift", ";", "enter", ",", ".", and "/") may extend higher and moreso than other keys on the keyboard as shown in FIG. 1, so as to be in the comfort zone of a user. The key pillows in the home row and row thereabove served by the pinky and ring fingers may additionally or alternatively have surfaces that are angled inward toward the center of the row or angled outward away from the center of the row. The keys in the row above the home row may additionally or alternatively have surfaces angled downward toward the home row (i.e., the row beginning with "a") so as to physically position the keys closer to the shorter pinky and ring fingers. In a preferred embodiment of the invention, the key pillows in the home row and row thereabove served by, and farthest from, the pinky and ring finger may include the greatest angle of inclination inward toward the center or downward toward the home row or even away from the home row. Providing these key pillows with a greater extension into the comfort zone relative to other surrounding key pillows makes it easier to strike these keys by minimizing the repetitive stretching, twisting, and reaching of the shorter pinky and ring fingers. This, in turn, reduces the strain experienced by muscles and tendons in the lower arm, neck, and shoulder while typing.

In a preferred embodiment, the surfaces of the remaining key pillows in the home row and row thereabove may also be extended downward toward the home row as shown in FIG. 1. Moreover, the key pillow covering the space bar may include one or more elevated sections, against which the thumb may strike. By providing one or more raised surfaces over the space bar, the amount by which the hand must rotate and/or the amount by which the thumb must extend to depress the space bar is reduced. Again, inclining or elevating the surfaces of the above described key pillows makes it easier to depress these keys by minimizing the repetitive stretching, twisting, and reaching of the fingers. This, in turn, reduces the strain experienced by muscles and tendons in the lower arm, fingers, hands, neck, and shoulder while typing. Although a preferred embodiment includes key pillows with elevated and inclined surfaces, it is contemplated that the key pillows have even and substantially parallel upper surfaces, used in conjunction with other inventive features of the present invention, in alternative embodiments. Additionally, it is contemplated that each key have the same shape, contour and inclination in an alternative embodiment of the invention. By surfaces of the key pillows as used above to define the shape of the key pillows, this language is intended to describe the three-dimensional surface of the key pillows, and not simply the upper surfaces of the key pillows. Thus, it could be said that the key pillows have a sculpted form that extends into the comfort zone of a user.

Figure 7:
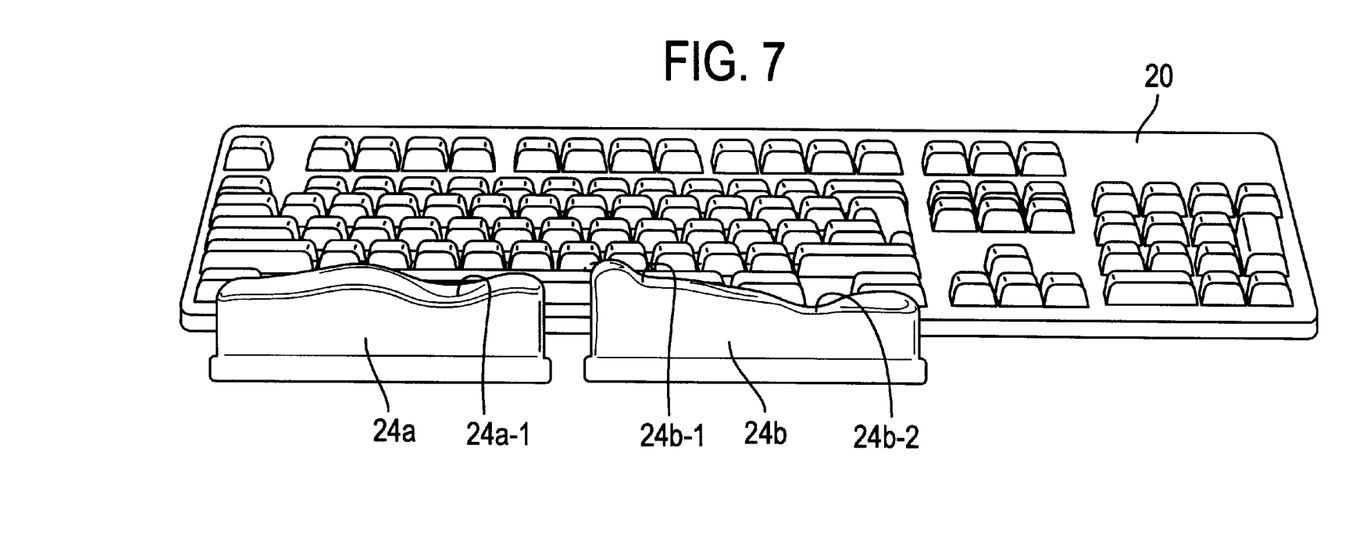
FIG. 7 is a view illustrating the palm rests according to the present invention attached to a keyboard.

The present invention further includes raised pads 24a and 24b shown in detail in FIG. 7. The pads are preferably formed integrally on attachment 22, but may alternatively be affixed to attachment 22 after formation thereof. It is also possible that the pads 24a and 24b are simply manufactured separately from the attachment 22 and later connected thereto or placed proximate to the keyboard in a position comfortable to the user. The pads 24a and 24b are preferably slightly deformable so that the thenar eminence and hypothenar eminence of the hands may rest comfortably thereon, and may be formed of the same or different material as attachment 22 or individual key pillows 26. In a preferred embodiment, the pads may have a height of approximately 0.5 inches to approximately 3 inches, and optimally about 1 inch to about 2 inches. That is, in the preferred embodiment, the pads have a varying height across their width. The heights listed above may vary in alternative embodiments of the invention so as to accommodate hands of different users, which vary in size. Alternatively, the pads may be uniform in height. The pads may be shaped so as to accommodate the contour of the hand or have a dip to avoid pressure on the carpal tunnel. Although a preferred embodiment of the invention includes two pads, it is understood that there may be one long pad along the front of keyboard 20, or a pad comprised of several segments. The pads function to elevate a typist's palms relative to the keyboard during typing or resting. That is, the pads 24a and 24b maintain the user's palms at a height above the lip of the keyboard. The pads additionally support the weight of a typist's hands, arms, and shoulders, thereby reducing strain at the neck and shoulders. The pads preferably suspend the palms so that the palms of the user are at a height greater than the lip of the keyboard. The lip of the keyboard is that portion of the keyboard between the front of the space bar and the front of the keyboard, with the front being the edge closest to the typist while maintaining a typing position.

As indicated in the Background of the Invention section, extended typing with the wrists bent at an awkward angle is a significant contributor to CTS and other repetitive strain injuries. The height of the palm rests allows the user to comfortably manipulate the key pillows 26 or conventional keys and easily rest his/her hands while reducing awkward bending of the wrist. Although a preferred embodiment includes pads 24a and 24b, it is contemplated that the pads may be omitted from the invention in alternative embodiments. The pads 24a and 24b preferably have a groove 24a-1, 24b-1 formed therein to accommodate the thumb or thenar eminence of the user to allow the user to more easily access the space bar and keys or key pillows of the keyboard. Also, each palm rest may have a central dip 24b-2 located therein for support of the carpal tunnel.

The invention has thus far been described as an attachment to a keyboard including a plurality of key pillows 26 and/or pads 24a and 24b provided on an attachment 22 to form a continuous sheet over the keyboard. However, in an alternative embodiment of the present invention, instead of forming a continuous attachment, each of the key pillows may be independent pieces, which may be added to select keys on keyboard 20 as desired. In this embodiment, each individual key pillow may include a lower surface having a negative impression fitting partially or completely over select keys, and maintained thereon by a pressure contact between the key pillow 26 and key. Alternatively, the individual key pillows 26 may have a flat lower surface, and may be affixed to select keys by an adhesive. It is possible that only the keys farthest outside of the user's comfort zone will have key pillows affixed thereto. As a further alternative, selected keyboard keys may be omitted or removed, and the individual key pillows mounted over the key posts protruding from the keyboard. The individual key pillows according to this embodiment may be formed with the same materials, textures, elevations, shapes, or inclinations as the key pillows described above as part of attachment 22.

In the embodiment described in the preceding paragraph, the pads 24a and 24b may be affixed to the front edge of the keyboard by a pressure fit, an adhesive, or both. It is equally possible that the pads 24a and 24b are not fixed to the keyboard, but rather are simply used proximate the keyboard. It is also possible that only a single palm rest is used, rather than two palm rests. Such would be the case where the user is operating a mouse, such as that shown in FIG. 8, with a single hand.

When the key pillows are attached to selected individual keys of the keyboard, the key pillows of the selected keys still extend into the comfort zone of a user. That is, the key pillows are shaped so as to be easily reached by the fingers and hands of a user without undue stretching or twisting of the fingers, hands, and wrists, thereby decreasing the user's chances of incurring a RSI such as Carpal Tunnel Syndrome.

As an alternative embodiment, the keyboard may be formed as a attachment 22 shown in FIG. 1. The key pillows 26 are formed thereon and replace the keys of the keyboard 20. As shown in this drawing, the palm rests 24a and 24b are integral with the attachment 22, which acts as the keyboard 20. Also, the palm rests according to the present invention as shown in FIG. 7 may be used with a conventional keyboard as shown in FIG. 7.

Figure 6:
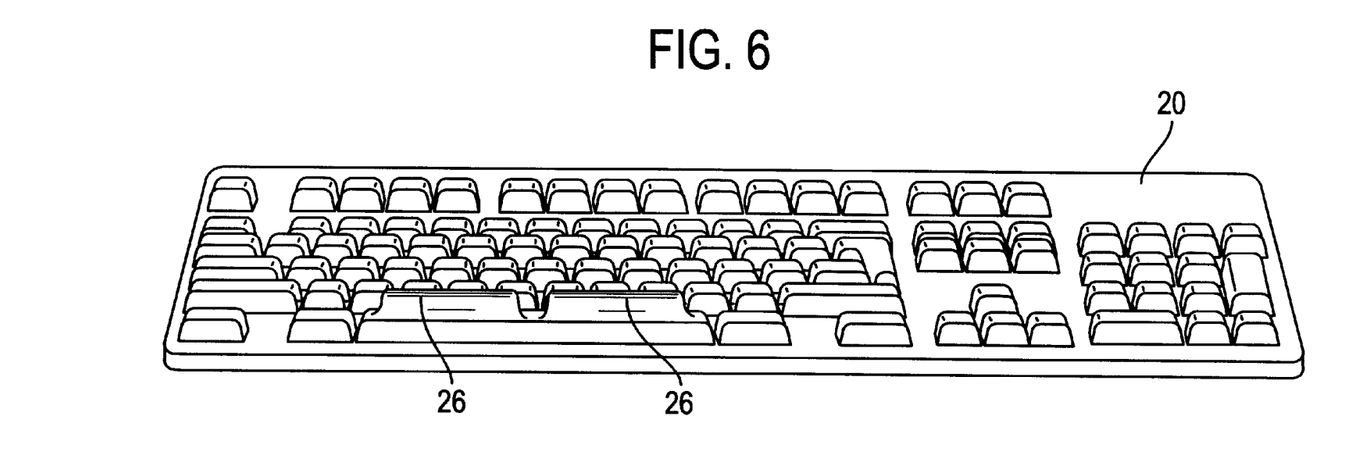
FIG. 6 is a perspective view of another embodiment of the present invention where only a single key, i.e., the space bar, extends into the comfort zone of a user.

In an alternative embodiment, the keyboard is formed to have only a single key pillow formed thereon. Such a device is shown in FIG. 6, where the key pillow 26 is formed only on the space bar. Although other keys might have the single key pillow 26 thereon, the key that includes the key pillow is usually one that is used often, such as the space bar, the shift key, or the enter button.

Figure 2:
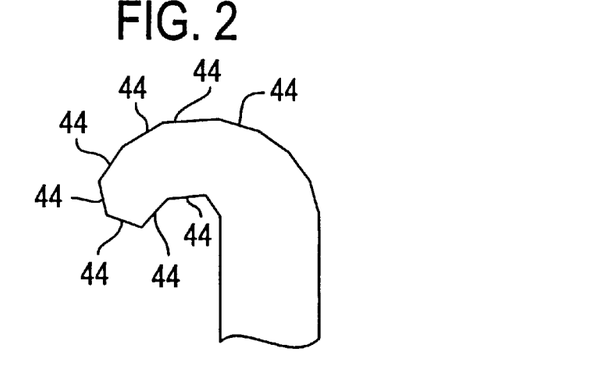
FIG. 2 is a sectional view of a key according to one embodiment of the present invention.
Figure 3:
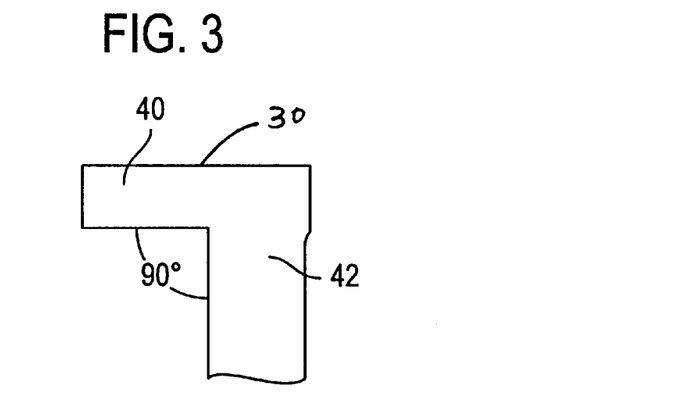
FIG. 3 is a sectional view of a key according to another embodiment of the present invention.
Figure 4:
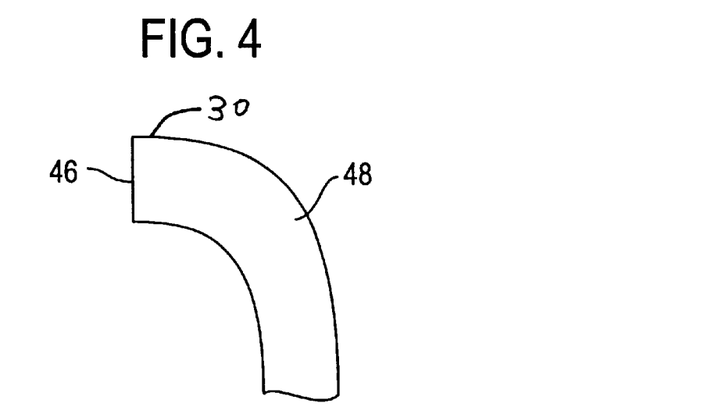
FIG. 4 is yet another sectional view of a key of the keyboard according to yet another embodiment of the present invention.

The keys of the keyboard may be formed as shown in FIGS. 2–4. FIG. 2 illustrates key pillows which extend into a comfort zone of a user and whose shape is that of a plurality of line segments 44 joined together to form a continuous semi-curved surface. Alternatively, as shown in FIG. 3, the key pillows could be formed as two blocks, 40 and 42, that intersect at an angle of up to 90°. Alternatively, as shown in FIG. 4, the key pillows could be formed with a flat top surface 46 and an arcuate stem 48. Regardless as to the method of key formation, every key will provide a striking surface 30 that may be pressed or struck to acuate the key. Any and all of these key pillows shown in FIGS. 2–4 could be incorporated into a single keyboard. As shown in FIG. 1, key pillows corresponding to those shown in FIG. 2 are labelled 26-2, those corresponding to FIG. 3 are labelled 26-3, and those corresponding to FIG. 4 are labelled 26-4.

Figure 5A:
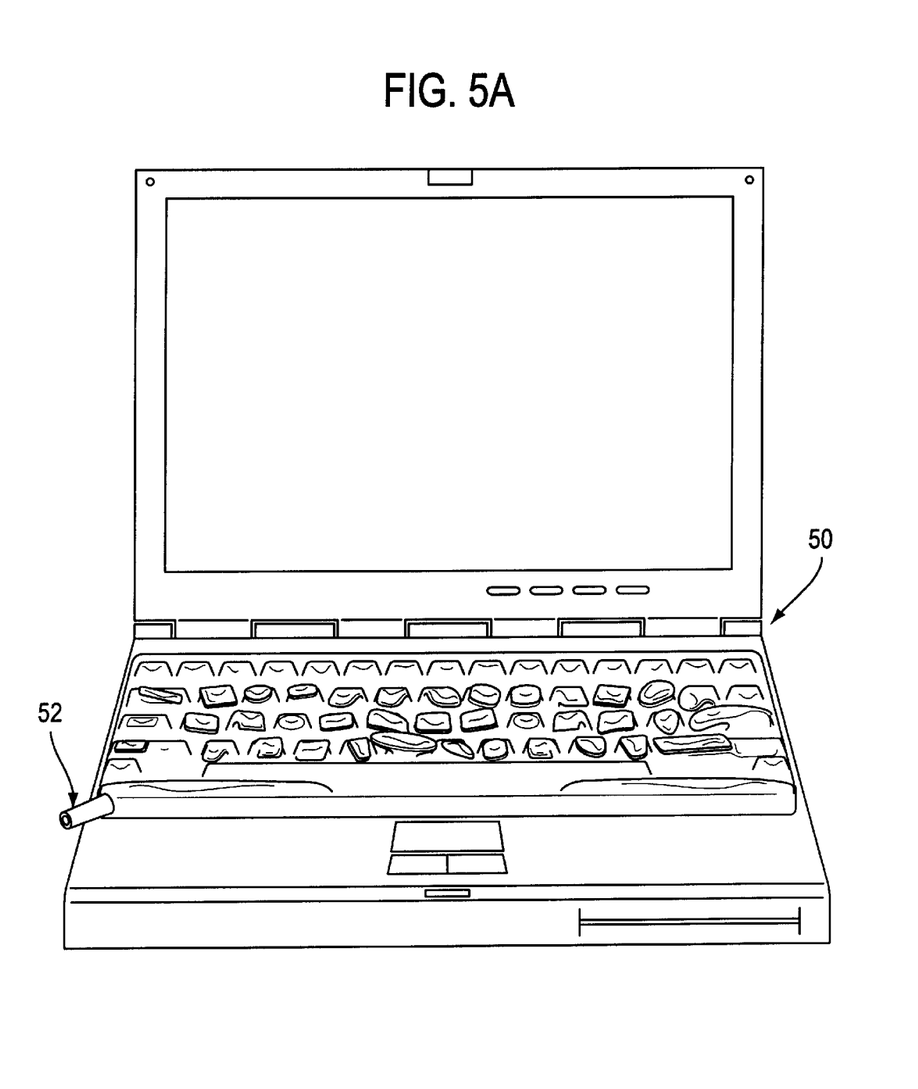
FIG. 5A is a perspective view of a keyboard which has the key pillow assembly according to the present invention and is inflatable for use with portable computers or other device and is shown in the deflated state.
Figure 5B:
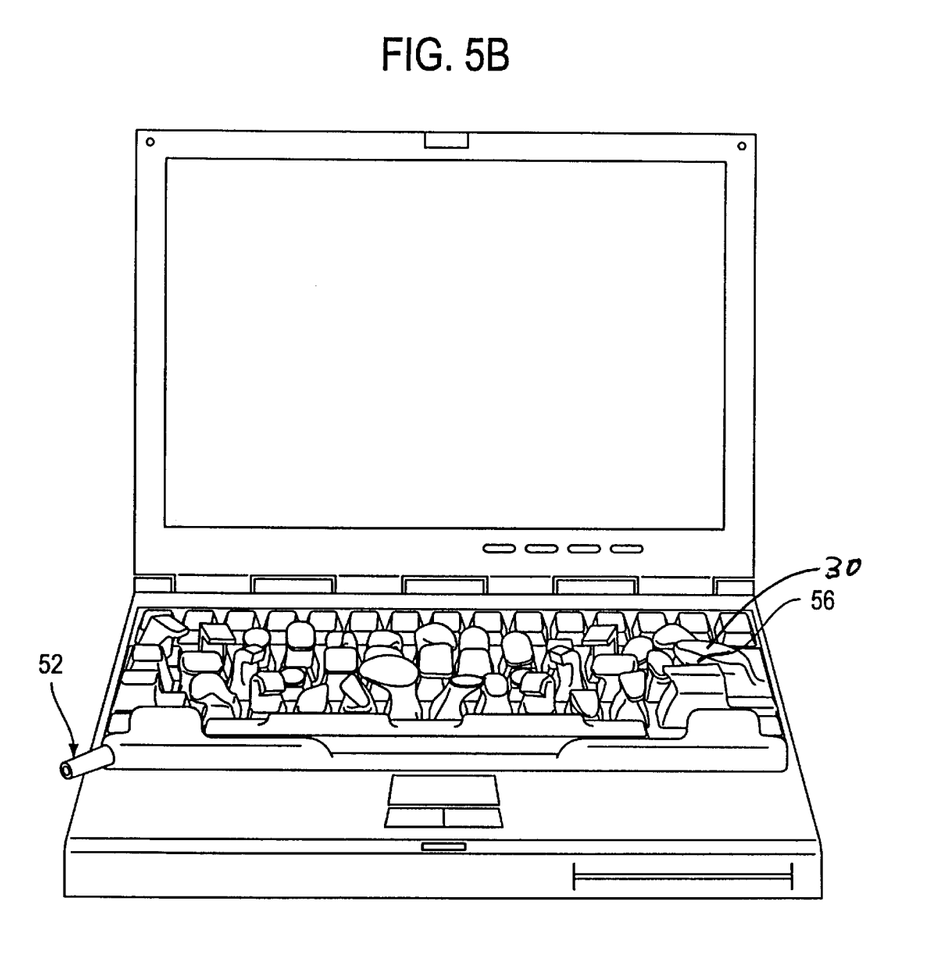
FIG. 5B is a perspective view of a keyboard which has the key pillow assembly according to the present invention and is inflatable for use with portable computers or other device and is shown in the inflated state.

FIGS. 5A and 5B illustrate another embodiment of the present invention, which is particularly useful for portable computers 50 and other portable devices which incorporate CPU's and require some input through a keyboard. A laptop computer is depicted in FIG. 5A. The keyboard with the key pillows formed thereon is inflatable through an inlet 52. It is also possible to have the keyboard automatically inflate. Thus, the keyboard may be deflated as shown in FIG. 5A for easy carrying. When inflated, as shown in FIG. 5B, the key pillows 56 are shaped as shown in FIGS. 2–4 and the keyboard as in FIG. 1. When deflated, the keyboard packs away for easy storage.

As noted above, the present invention may be utilized on devices other than keyboards. Computer mice are just such an example. Mice are getting more and more complicated and are being sold with several, i.e., three or more, keys thereon. Use of computer mice can also be a significant source of RSI. FIG. 8 illustrates the present invention as applied to computer mice. The mouse is shown with key pillow 86 formed thereon, with the key pillow extending into the comfort zone of a user.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

What is claimed is:

1. A keyboard comprising a plurality of keys, each key having a key pillow with a striking face shaped such that:

said striking faces of the key pillows are disposed at varying heights such that the striking face of a key pillow, in a home row, typically struck with a middle finger is lower than the striking face of a key pillow in said home row typically struck with a pinky finger of a user;

orientation of the striking face of a key pillow, with respect to a horizontal plane, varies with the location of each key in the keyboard; and the planar projection of the striking face of each of a plurality of key pillows comprising said keyboard is irregular and not rectilinear in shape.

2. The keyboard of claim 1, wherein the planar projection of the striking faces of a plurality of key pillows comprising said keyboard are substantially ovoid.

3. The keyboard of claim 1 wherein said keyboard includes a row of keys, said row of keys includino three or more letter keys wherein the striking faces of the key pillows of three or more letter keys in said row have different lateral offsets.

4. The keyboard of claim 1 wherein said keyboard includes a row of keys, said row of keys including three or more letter keys wherein the striking faces of key pillows of said three or more letter keys in said row have different forward offsets.

5. The keyboard of claim 1, wherein said keyboard comprises a row of keys wherein the orientation of the striking faces of key pillows of said keys varies along said row.

6. The keyboard of claim 1, wherein the plurality of keys form a continuous alphanumeric keypad.

7. The keyboard of claim 1, wherein said plurality of keys include letter keys and said keyboard comprises a "K" key and a "D" key and the striking faces of the key pillows of the "K" and "D" keys are the lowest striking faces of all of the letter keys.

8. The keyboard of claim 1, wherein said keyboard comprises a row of keys, wherein the orientation of a major principal axis of the striking face of each of the key pillows in said row varies with the position of the keys in said row.

9. The keyboard of claim 1, wherein the striking faces of said key pillows are made from a soft, shock absorbant material.

10. The keyboard of claim 1, wherein said keyboard comprises at least one key pillow having two striking faces.

11. The keyboard of claim 5, wherein the key pillows in the row above the home row have surfaces angled downward toward the home row so as to physically position the striking faces of the keys closer to the pinky and ring fingers.

* * * * *